United States Patent
Belz et al.

(10) Patent No.: US 11,103,872 B2
(45) Date of Patent: Aug. 31, 2021

(54) RACK POSITIONING SYSTEM

(71) Applicant: Roche Diagnostics Operations, Inc., Indianapolis, IN (US)

(72) Inventors: Renato Belz, Rothenburg (CH); Armin Bucher, Neuenkirch (CH); Christian Thalmann, Stansstad (CH); Reto Joho, Villmergen (CH); Thomas Huber, Stans (CH)

(73) Assignee: Roche Diagnostics Operations, Inc., Indianapolis, IN (US)

( * ) Notice: Subject to any disclaimer, the term of this patent is extended or adjusted under 35 U.S.C. 154(b) by 411 days.

(21) Appl. No.: 16/118,490

(22) Filed: Aug. 31, 2018

(65) Prior Publication Data

US 2019/0076848 A1   Mar. 14, 2019

(30) Foreign Application Priority Data

Sep. 8, 2017   (EP) ..................................... 17190199

(51) Int. Cl.
  B01L 9/00       (2006.01)
  G01N 35/04      (2006.01)
  (Continued)

(52) U.S. Cl.
  CPC ................ B01L 9/523 (2013.01); B01L 9/06 (2013.01); B01L 9/543 (2013.01); G01N 35/04 (2013.01);
  (Continued)

(58) Field of Classification Search
  CPC .. B01L 9/523; B01L 9/06; B01L 9/543; B01L 9/00; B01L 2200/025;
  (Continued)

(56) References Cited

U.S. PATENT DOCUMENTS 6,586,255 B1 * 7/2003 Hubert ............... G01N 35/0099
                                                422/504
7,275,807 B2 * 10/2007 Van Tuyl ............. B01L 3/0268
                                                347/46
(Continued)

FOREIGN PATENT DOCUMENTS

| JP | 2017-040511 A |   | 2/2017 |           |
|----|---------------|---|--------|-----------|
| JP | 2017040511 A  | * | 2/2017 | G01N 35/10 |

OTHER PUBLICATIONS

European Search Report dated Mar. 7, 2018, in Application No. 17190199, 3 pp.

*Primary Examiner* — Kathryn Wright
*Assistant Examiner* — Curtis A Thompson
(74) *Attorney, Agent, or Firm* — Roche Diagnostics Operations, Inc.

(57) ABSTRACT

A positioning system for positioning a consumable rack in a diagnostic system is disclosed. The positioning system comprises a rack comprising an upper surface comprising holding positions and a receiving compartment comprising a rectangular chassis comprising front, rear, and two lateral sides. The receiving compartment comprises a holding structure coupled to the chassis to move between first and second positions. The rack comprises sidewalls. At least three sidewalls have a center alignment element. The chassis comprises three chassis alignment elements on the rear and two lateral sides. The holding structure comprises a corner push element between the chassis front and lateral sides to push against a side edge of the rack between two sidewalls when the holding structure is moved from the first position towards the second position forcing the three alignment elements against a chassis alignment element and laterally holding the rack in position by the chassis alignment elements.

15 Claims, 6 Drawing Sheets

(51) Int. Cl.
  *B01L 9/06* (2006.01)
  *G01N 35/10* (2006.01)
  *B65G 59/08* (2006.01)
  *B65G 47/74* (2006.01)

(52) U.S. Cl.
  CPC .......... *B01L 9/00* (2013.01); *B01L 2200/025* (2013.01); *B01L 2300/0809* (2013.01); *B65G 47/74* (2013.01); *B65G 59/08* (2013.01); *G01N 2035/0418* (2013.01); *G01N 2035/0427* (2013.01); *G01N 2035/0491* (2013.01); *G01N 2035/103* (2013.01); *G01N 2035/1027* (2013.01)

(58) Field of Classification Search
  CPC ............ B01L 2300/0809; G01N 35/04; G01N 2035/103; G01N 2035/0491; G01N 2035/0418; G01N 2035/0427; G01N 2035/1027; B65G 59/08; B65G 47/74
  See application file for complete search history.

(56) References Cited

U.S. PATENT DOCUMENTS

| | | | | |
|---|---|---|---|---|
| 7,360,984 | B1 * | 4/2008 | Sugiyama | ............... B01L 9/543 414/798.1 |
| 8,496,875 | B2 * | 7/2013 | Greenstein | ......... G01N 35/1095 422/65 |
| 2012/0128459 | A1 | 5/2012 | Hoyer et al. | |
| 2013/0011224 | A1 | 1/2013 | Hoyer et al. | |

* cited by examiner

RACK POSITIONING SYSTEM

CROSS-REFERENCE TO RELATED APPLICATIONS

This application claims priority to EP 17190199.4, filed Sep. 8, 2017, which is hereby incorporated by reference.

BACKGROUND

The present disclosure relates to a rack positioning system for positioning racks of consumables in an automated in vitro diagnostic system and to an automated in vitro diagnostic system comprising the rack positioning system.

In some automated in vitro diagnostics systems, consumables have to be loaded into the system to be used in an automated analysis process. The loading process may be automated or semi-automated. Some in-vitro diagnostic systems are equipped with a drawer for loading consumables into the automated analysis system. In these systems, an operator can store consumables in a rack and put the rack into the loading drawer. Subsequently, the operator closes the drawer and thereby moves the rack in the drawer into a working area of the automated analysis system. Other systems comprise a lift that raises a stack of racks from a lower part of the analysis system to a rack separation station, located higher, where a rack at a time located at the uppermost position of the stack is separated from the stack and becomes available for use.

Regardless of the loading mechanism, once a rack reaches its final position in the in vitro diagnostic system, the automated in vitro diagnostic system can manipulate the consumable(s) loaded into the rack. For example, a robotic manipulator can grip the consumable(s) loaded (e.g., grip pipette tips and/or vessels stored in the rack) for further processing.

Such robotic or otherwise automated manipulators can require a fairly precise placement of the consumables loaded. In some cases, a manipulator can be taught to grip a particular piece of consumable in the rack in a particular position. In some examples, the manipulator only tolerates fairly small deviations from a taught position (e.g., less than 100 µm). If this tolerated deviation is exceeded, the manipulator might cease to work properly and reliably. This can require re-teaching of the robotic manipulator and/or result in malfunctions of the automated in vitro diagnostic system.

One known rack positioning system can achieve a certain degree of precision in positioning a rack. It, however, does not take into account that racks, typically made of plastic material, can undergo dimensional changes, especially over prolonged use. Thus the positioning precision may vary.

SUMMARY

According to the present disclosure a rack positioning system for positioning a consumable rack in an automated in vitro diagnostic system is presented. The rack positioning system can comprise a consumable rack comprising an upper surface. The upper surface can comprise a plurality of consumable holding positions. The consumable rack can have a squared shape with the upper surface having a squared shape and a center. The consumable rack can comprise sidewalls on respective sides of the consumable rack. At least three rack sidewalls can each comprise a rack alignment element aligned with the center. The rack positioning system can also comprise a rack receiving compartment comprising a fixedly mounted chassis having a rectangular shape comprising a front side, a rear side, and two lateral sides and a rack holding structure movably coupled to the chassis such as to be movable between at least a first position (X) and a second position (X−Δ) relative to the chassis. The chassis can comprise three chassis alignment elements, each arranged at a fixed position of the rear side and each of the two lateral sides respectively. The consumable rack holding structure can comprise a rack push element arranged at a corner between the chassis front side and a chassis lateral side such as to push against a side edge of the rack between two rack sidewalls when the rack holding structure is moved from the first position (X) towards the second position (X−Δ), thereby forcing each of three rack alignment elements against a respective chassis alignment element and laterally holding the consumable rack in a fixed position delimited by the three chassis alignment elements.

In accordance with one embodiment of the present disclosure, an automated in vitro diagnostic system comprising the above rack positioning system is also presented.

Other features of the embodiments of the present disclosure will be apparent in light of the description of the disclosure embodied herein.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which.

DETAILED DESCRIPTION

Figure 1:
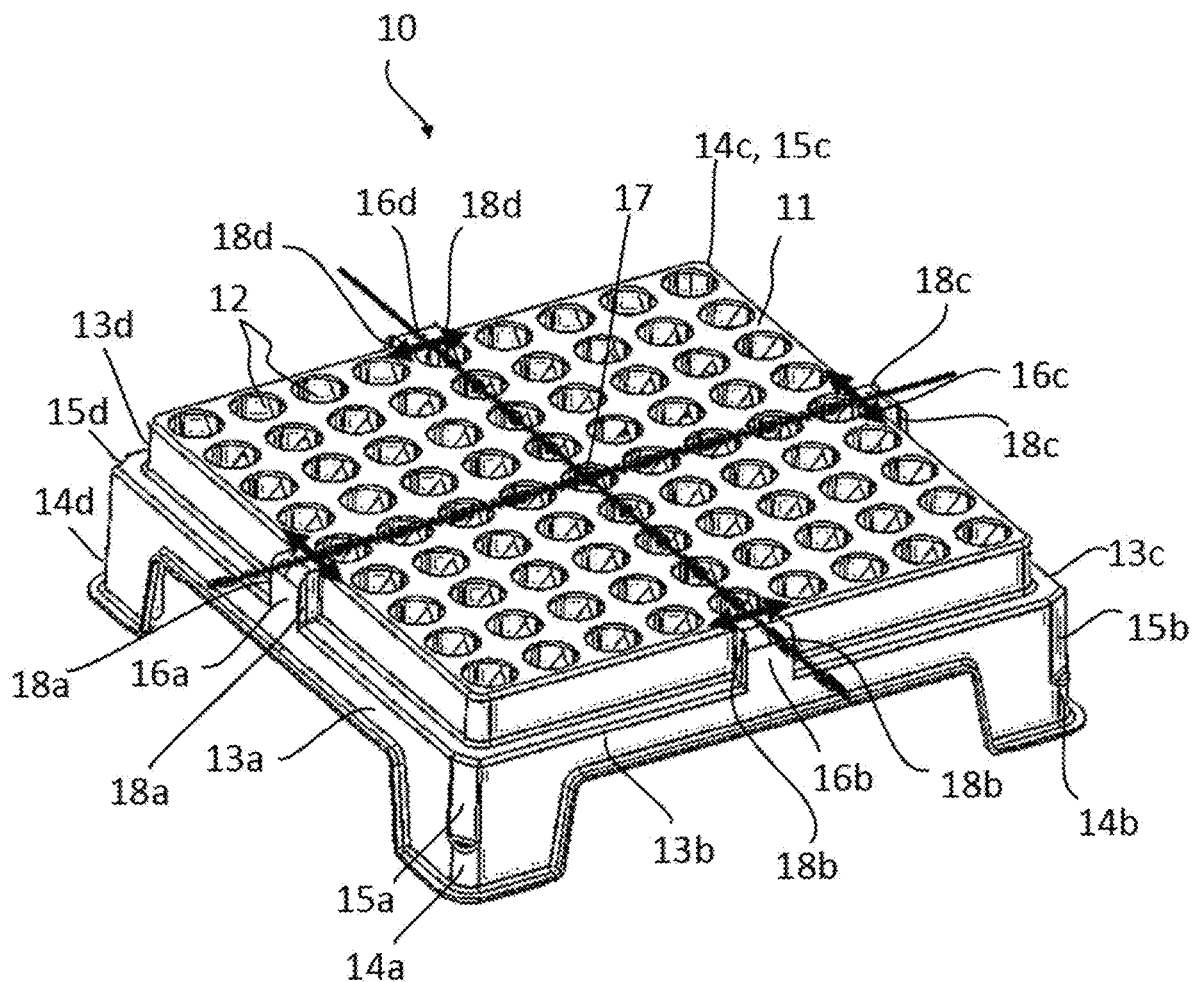
FIG. 1 illustrates an example of consumable rack in three-dimensional perspective according to an embodiment of the present disclosure.

In the following detailed description of the embodiments, reference is made to the accompanying drawings that form a part hereof, and in which are shown by way of illustration, and not by way of limitation, specific embodiments in which the disclosure may be practiced. It is to be understood that other embodiments may be utilized and that logical, mechanical and electrical changes may be made without departing from the spirit and scope of the present disclosure.

A rack positioning system for positioning consumable racks in an automated in vitro diagnostic system is herein disclosed. The rack positioning system can comprise a consumable rack comprising an upper surface, the upper surface comprising a plurality of consumable holding positions.

The rack positioning system can further comprise a rack receiving compartment comprising a fixedly mounted chassis of substantially rectangular shape, comprising a front side, a rear side and two lateral sides.

The rack receiving compartment can further comprise a rack holding structure movably coupled to the chassis such as to be movable between at least a first position and a second position relative to the chassis.

The consumable rack can have a substantially squared shape with the upper surface having a substantially squared shape and a center. The consumable rack can further comprise rack sidewalls on respective sides of the rack. At least three rack sidewalls can each comprise a rack alignment element substantially aligned with the center.

The chassis can comprise three chassis alignment elements, each arranged at a fixed position of the rear side and each of the two lateral sides respectively.

The rack holding structure can comprise a rack push element arranged at a corner between the chassis front side and a chassis lateral side such as to push against a side edge of the rack between two rack sidewalls when the rack holding structure is moved from the first position towards the second position, thereby forcing each of three rack alignment elements against a respective chassis alignment element and laterally holding the consumable rack in a fixed position delimited by the three chassis alignment elements.

An automated in vitro diagnostic system comprising the above rack positioning system is herein also disclosed.

The rack positioning system herein disclosed can have one or more advantageous effects. The substantially squared shape of the rack and the central locations of the rack alignment elements can contribute to equally distribute the manufacturing dimension tolerances of the rack with respect to the center of the rack and to minimize amplification of the error in positioning due to possible dimensional changes of the rack, e.g., shrinkage or expansion of the rack width between two opposite sidewalls, due e.g., to aging, to temperature exposure and to applied pressure. In combination, the arrangement of the rack push element in proximity of the chassis front side such as to push against one side edge of the rack when the rack holding structure is moved from the first position towards the second position, thereby forcing each of three rack alignment elements against a respective chassis alignment element, can contribute to obtaining a substantial equilibrium of the forces in the lateral directions, thereby further minimizing the possible dimensional changes of the rack and further increasing positioning precision.

Thus, the rack positioning system of the present disclosure can ensure that a rack and hence the consumable holding positions can be positioned with a certain precision relative to the chassis and that this precision can be maintained. In this manner, a manipulator of an automated in vitro diagnostic system (e.g., a robotic manipulator) can pick a consumable from any of the consumable holding positions or place a consumable into any of the consumable holding positions in a precisely taught position. Thus, a risk of system malfunctions or damage due to imprecisely picked or placed consumables or failures to pick or place consumables can be reduced or even eliminated.

An "automated in vitro diagnostics system" can be a laboratory automated apparatus dedicated to the analysis of samples for in vitro diagnostics. The in vitro diagnostics system may have different configurations according to the need and/or according to the desired laboratory workflow. Additional configurations may be obtained by coupling a plurality of apparatuses and/or modules together. A "module" can be a work cell, typically smaller in size than the entire in vitro diagnostics system, which can have a dedicated function. This function can be analytical but can be also pre-analytical or post analytical or it can be an auxiliary function to any of the pre-analytical function, analytical function or post-analytical function. In particular, a module can be configured to cooperate with one or more other modules for carrying out dedicated tasks of a sample processing workflow, e.g., by performing one or more pre-analytical and/or analytical and/or post-analytical steps. Thus, the in vitro diagnostic system may comprise one analytical apparatus or a combination of any of such analytical apparatuses with respective workflows, where pre-analytical and/or post analytical modules may be coupled to individual analytical apparatuses or be shared by a plurality of analytical apparatuses. In alternative, pre-analytical and/or post-analytical functions may be performed by units integrated in an analytical apparatus. The in vitro diagnostics system can comprise functional units such as liquid handling units for pipetting and/or pumping and/or mixing of samples and/or reagents and/or system fluids, and also functional units for loading, unloading, sorting, storing, transporting, identifying, separating, detecting.

A "consumable rack" herein also interchangeably referred to as rack or rack of consumables, can be a carrier configured to hold consumables for transportation, for ease of handling and for automated use of the consumables by the automated in vitro diagnostic system. The rack itself may be reusable, e.g., may be refilled with consumables. A rack can typically be used for loading consumables into an in vitro diagnostic system. However, empty racks may be also used for receiving and unloading used consumables from an in vitro diagnostic system. In particular, the rack can comprise an upper surface, the upper surface typically comprising a plurality of consumable holding positions. In principle, single consumable carriers with only one consumable holding position may be used for certain needs. The number of consumables holding positions as well as their arrangement and form may vary according to the particular consumables of interest and particular use. For example, the consumable holding positions may be conveniently arranged in ordered one or two dimensional arrays at fixed distance between each other and possibly arranged in a compact manner that maximizes the number of positions per given surface. A consumable holding position may have for example the form of a hole, a recess, a cavity or delimited area, that can be of any geometry and size depending on the geometry and size of the consumable. According to particular uses, a consumable holding position may comprise additional functional elements, e.g., inserts or adapters, e.g., resilient members, for improving the holding of the consumables, e.g., for centering a consumable in the consumable holding position and/or for accommodating consumable of possible different diameter.

A "consumable" can be a device which can be introduced recurrently into an in vitro diagnostic system mostly for use in an analytical process, but can be also for use in a pre-analytical or post-analytical process. A consumable may be used a single time before being replaced, or it may be used multiple times. Examples of consumables include pipetting tips, reaction vessels, fluid containers in general, e.g., containing reagents, quality control samples, calibrators and the like.

Racks according to the present disclosure may in principle be used also for sample containers, e.g., sample tubes.

The rack of the present disclosure can have a substantially squared shape (seen from the top) with the upper surface having a substantially squared shape and a center located at the crossing of the diagonal lines of the squared upper surface.

The rack can further comprise rack sidewalls on respective sides of the rack, conveniently but not necessarily four sidewalls, extending downwards from the upper surface and having substantially equal height and preferably also substantially equal length. In particular, for increased stability, the four rack sidewalls may be joined to each other by four side edges diagonally arranged relative to the upper surface such as to form a continuous perimeter wall around the rack.

At least three rack sidewalls can each comprise a rack alignment element substantially aligned with the center of the upper surface.

The term "substantially" or "substantial" can herein be used to include any deviation from the specified geometry, size, measure or location, which can be equivalent in function or at least falling within a pre-determined tolerance range, e.g., up to about 5% or even about 10% if a worsening of the effect as a result of such deviation is still considered acceptable for a given application.

For example, the term substantially squared may include geometries with rounded or cut corners, which play no role for the teaching of this disclosure, and/or slight asymmetries, e.g., slight differences between width and length due to manufacturing tolerances, which can be, in part, also roots of the problem that the present disclosure aims at solving.

A "rack positioning system" can be a functional unit either distinguishable as individual and exchangeable module coupled to an in vitro diagnostic system or integrated into an in vitro diagnostic system, and possibly sharing components and/or cooperating with other components or functional units of the in vitro diagnostic system. The function of the rack positioning system can be to ensure that consumable racks are positioned within a tolerance range of space in relation to taught space coordinates of a robotic consumable manipulator for consumables to be picked from a rack or to be placed onto a rack in connection to the use of the consumables by the in vitro diagnostic system.

The rack positioning system can comprise a rack receiving compartment, which can be a three-dimensional space configured to receive at least one rack at a time and hold a rack in a fixed and steady position within such three-dimensional space. The rack positioning system may comprise however a plurality of rack receiving compartments or a rack receiving compartment configured to accommodate a plurality of racks at a time. In particular, the rack receiving compartment can comprise a fixedly mounted chassis of substantially rectangular shape, comprising a front side, a rear side and two lateral sides. The rack receiving compartment can further comprise a rack holding structure movably coupled to the chassis such as to be movable between at least a first position and a second position relative to the chassis.

The term "chassis" can be used in the present disclosure to identify a part of the rack receiving compartment which can be fixed with respect to the rack positioning system and may not move when the movable rack holding structure is moved. The term "chassis" is not used as being limited to a particular function or a particular configuration. For example, a chassis can include a frame carrying different elements of the rack positioning system or an element attached to a frame or other fixed part of the rack positioning system. In other examples, a chassis can be part of a housing of the rack positioning system.

The chassis can comprise three chassis alignment elements, each arranged at a fixed position of the rear side and each of the two lateral sides respectively. "Chassis alignment elements" can be elements of the chassis that can act as fixed references for positioning of the rack, each chassis alignment element preventing further movement of the rack in at least one direction and together with the rack holding structure limiting further lateral movement of the rack.

A "rack holding structure" can be a mechanical device that can move relative to the fixed chassis and that depending on the assumed position can allow a rack to be introduced into the rack receiving compartment or removed from the rack receiving compartment or to hold a rack in a fixed and steady position in the rack receiving compartment.

In particular, the rack holding structure can comprise a rack push element arranged at a corner between the chassis front side and a chassis lateral side such as to push against a side edge of the rack between two rack sidewalls when the rack holding structure is moved from the first position towards the second position, thereby forcing each of three rack alignment elements against a respective chassis alignment element and laterally holding the rack in a fixed position delimited by the three chassis alignment elements.

A "rack push element" can be a contact tool configured to move in either of two opposite directions together with the rack holding structure when the rack holding structure moves between different positions thereby applying a directional push force against the rack when it is in contact with the rack. The direction of the applied force may be different from the direction of movement. For example, the contact tool may comprise a wedged shape that may slide against the side edge of the rack or a ball bearing for reducing friction by rolling against the side edge of the rack. The rack push element may further comprise a resilient body or may be coupled to a resilient member in order to prevent overloading or underloading the rack push element and therefore allowing a certain tolerance in the amount and direction of the applied force when the rack holding structure is moved from the first position to the second position.

The term "laterally holding" can refer to the prevention of further movement of the rack in any lateral direction, i.e., towards any of the chassis front side, rear side or lateral sides and also to the prevention of angular movement (rotation) in a horizontal plane The chassis alignment elements can be arranged with respect to the respective chassis side such as to match the position of the rack alignment elements when the rack holding structure is moved from the first position towards the second position.

According to an embodiment, the rack alignment elements and the chassis alignment elements can be abutment elements comprising contact faces matching each other.

According to an embodiment, the contact faces of the rack alignment elements and the contact faces of the chassis alignment elements can have a different extension in the vertical direction respectively, such as to allow a positioning tolerance in the vertical direction.

The rack alignment elements and the chassis alignment elements may have however any other form-fit relationship.

According to an embodiment, the rack push element can be arranged such as to apply a force to the side edge at an angle different with respect to a 45 degrees angle of a diagonal line of the rack passing through the side edge such as to obtain a substantial equilibrium of lateral forces. In particular, the angle may be chosen by taking into account also friction forces acting between the contact faces of the rack alignment elements and the chassis alignment elements and thereby obtaining an even more precise equilibrium of forces in all lateral directions.

According to an embodiment, the angle can be an angle comprised between about 50 and about 70 degrees with respect to a horizontal line parallel to the rack sidewall facing the chassis front side.

According to an embodiment, the angle can be about 57 degrees.

According to an embodiment, the rack holding structure can further comprise a pair of base plates movable relative to each other between different positions corresponding to different distances between the base plates.

According to an embodiment, the base plates can be movable from an intermediate position corresponding to the first position of the rack holding structure, which can enable a rack to rest with at least part of a bottom on the base plates, i.e., at least part of a bottom of at least two opposite rack sidewalls, to a closed position corresponding to the second position of the rack holding structure where the base plates can be closer to each other and a rack can still be enabled to rest with at least part of the bottom on the base plates, and to an open position corresponding to a third position of the rack holding structure wherein the base plates can be farther from each other and a rack can be prevented from resting on the base plates.

According to an embodiment, the rack push element can be fixed to one of the base plates such as to move together with the base plate.

According to an embodiment, both base plates can move towards or away from each other as the rack holding structure moves between different positions. By doing so, a rack can be inserted into or removed from the rack receiving compartment through a bottom side of the chassis when the base plates are in the open position.

Movement of the base plates can be conveniently automated e.g., by a motorized spindle drive or any similar mechanism.

The rack holding structure can be also configured to be manually actuated, e.g., in order to move the rack push element and/or the base plates between different positions, and may comprise one or more locking mechanisms to fix the structure in any of the positions once reached.

The use of movable base plates by the rack holding structure can be entirely optional and unnecessary if the rack is inserted and removed through the chassis front side or for example from an upper side of the chassis. In that case, the rack receiving compartment or the chassis may comprise a fixed base independent of the rack holding structure.

According to an embodiment, the rack positioning system can further comprise at least one movable loading and/or unloading structure for loading and/or unloading a rack into the rack receiving compartment.

According to an embodiment, the at least one movable loading and/or unloading structure can be configured for inserting a rack into or taking a rack out of the rack receiving compartment through the front side of the chassis when the rack holding structure is in the first position.

According to an embodiment, the at least one movable loading and/or unloading structure can be configured for inserting a rack into or taking a rack out of the rack receiving compartment through a bottom side of the chassis when the rack holding structure is in the third position.

According to an embodiment, the rack positioning system can comprise a front movable loading structure for inserting a rack into the rack receiving compartment through the front side of the chassis and a bottom movable unloading structure for taking a rack out of the rack receiving compartment through the bottom side of the chassis.

According to an embodiment, the rack positioning system can comprise a bottom movable loading structure for inserting a rack into the rack receiving compartment through the bottom side of the chassis and a front movable unloading structure for taking a rack out of the rack receiving compartment through the front side of the chassis.

According to an embodiment, the at least one movable loading and/or unloading structure can comprise a lift mechanism for raising and/or lowering a stack of racks and handing over to and/or taking over from the rack receiving compartment one rack at a time.

According to an embodiment, the at least one movable loading and/or unloading structure can further comprise a separating device for separating a rack at a time from a stack of racks and handing over the rack to the rack receiving compartment.

An automated in vitro diagnostic system comprising a rack positioning system according to any of the above embodiments is herein also disclosed.

According to an embodiment, the automated in vitro diagnostic system can further comprise a consumable manipulator configured to cooperate with the rack positioning system to manipulate a particular piece of consumable in the rack in a particular consumable holding position.

A "consumable manipulator" can be an automated robotic device with a predefined range of movement in a three-dimensional space, including a space above the rack receiving compartment, and that can execute operations in connection to the use of consumables and consumable racks by the in vitro diagnostic system.

The consumable manipulator can be calibrated with respect to fixed reference points of the in vitro diagnostic system such as to increase its precision of movement within such three-dimensional space. In particular, the calibrated consumable manipulator can be taught to move to any particular coordinate with such three-dimensional space and especially in correspondence to and alignment with any of the consumable holding positions of a consumable rack, the positions of the consumable holding positions being known once a rack has been positioned by the rack positioning system.

According to some embodiments, the consumable manipulator can be configured as a gripper or multi-gripper grip consumables, e.g., a consumable at a time or a plurality of consumables at a time, e.g., vessels, e.g., reaction vessels, from a consumable rack or place consumables in any of the consumable holding positions of the consumable rack. According to other embodiments, the consumable manipulator can be configured as a pipette nozzle or multi-pipette nozzle to pick consumables, e.g., a consumable at a time or a plurality of consumables at a time, e.g., pipette tips, from a consumable rack or to place consumables in any of the consumable holding positions of the consumable rack, or to aspirate consumables such as liquids from liquid containers or dispense consumables such as liquids into liquid containers held in any of the consumable holding positions of the consumable rack.

Referring initially to FIG. 1, FIG. 1 illustrates an example of consumable rack 10. The consumable rack can comprise an upper surface 11 comprising a plurality of consumable holding positions 12 for holding consumables, e.g., reaction vessels (not shown). The consumable rack 10 can have a substantially squared shape with the upper surface 11 having a substantially squared shape.

The consumable rack 10 can further comprise four rack sidewalls 13a, 13b, 13c, 13d on respective sides of the rack 10, extending externally downwards from the upper surface 11 and having substantially equal height and length. The four rack sidewalls 13a, 13b, 13c, 13d can be joined to each other by four side edges 14a, 14b, 14c, 14d diagonally arranged relative to the upper surface 11 such as to form a continuous perimeter wall around the rack 10. The edges 14a, 14b, 14c, 14d can have at least partially a blunt face 15a, 15b, 15c, 15d.

The rack sidewalls 13a, 13b, 13c, 13d can each comprise a rack alignment element 16a, 16b, 16c, 16d substantially aligned with the center 17 of the upper surface 11 and therefore centrally located with respect to the respective sidewalls 13a, 13b, 13c, 13d.

The rack alignment elements 16a, 16b, 16c, 16d can be abutment elements comprising contact faces 18a, 18b, 18c, 18d respectively.

The entire consumable rack 10 may be made of one piece, e.g., using a polymeric material, e.g., by an injection molding process.

Figure 2:
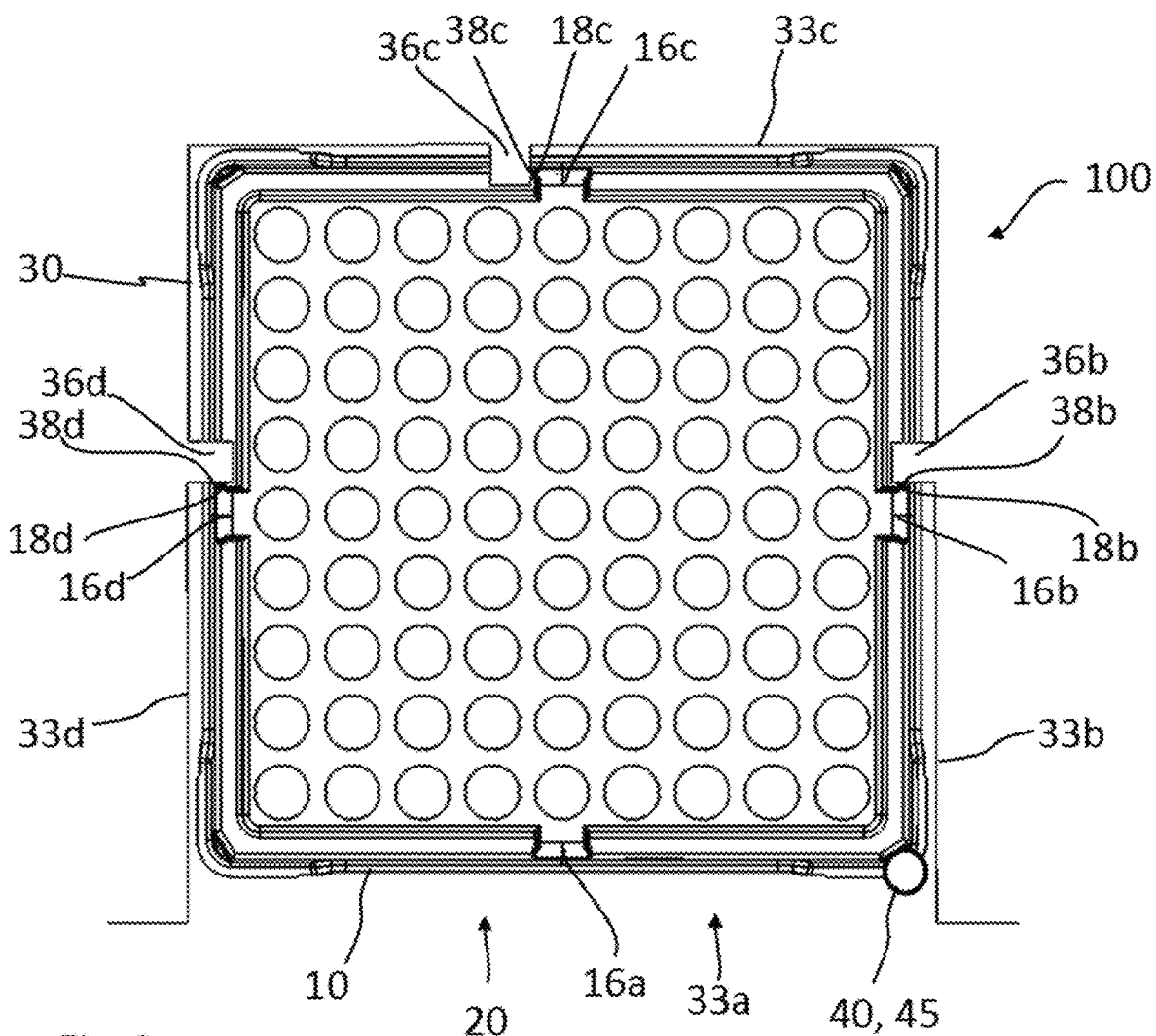
FIG. 2 illustrates a top view of the consumable rack of FIG. 1 positioned in a rack receiving compartment of a rack positioning system (parts removed for clarity) according to an embodiment of the present disclosure.

FIG. 2 is a top view of the consumable rack 10 of FIG. 1 positioned in a rack receiving compartment 20 of a rack positioning system 100 (parts removes for clarity).

The rack receiving compartment 20 can be a three-dimensional space configured to receive one consumable rack 10 at a time and to hold a consumable rack 10 in a fixed and steady position within such three-dimensional space. The rack receiving compartment 20 can comprise a fixedly mounted chassis 30 of substantially rectangular shape, comprising a front side 33a, a rear side 33c and two lateral sides 33b, 33d. The rack receiving compartment 20 can further comprises a rack holding structure 40 (better illustrated in connection to FIGS. 4-7) movably coupled to the chassis 30 such as to be movable between at least a first position and a second position relative to the chassis 30 (see FIG. 4 and FIG. 7).

The chassis 30 can comprise three chassis alignment elements 36b, 36c, 36d, each arranged at a fixed position of the rear side 33c and each of the two lateral sides 33b, 33d respectively. The chassis alignment elements 36b, 36c, 36d can be abutment elements comprising contact faces 38b, 38c, 38d matching the contact faces 18b, 18c, 18d of the rack alignment elements 16b, 16c, 16d respectively and can act as fixed references for positioning of the consumable rack 10.

The rack holding structure 40 can comprise a rack push element 45 arranged at a corner between the chassis front side 33a and a chassis lateral side 33b such as to push against the side edge 14a and particularly against edge face 15a of the rack 10 between two rack sidewalls 13a, 13b forcing each of three rack alignment elements 16b, 16c, 16d against a respective chassis alignment element 36b, 36c, 36d and laterally holding the consumable rack 10 in a fixed position delimited by the three chassis alignment elements 36b, 36c, 36d. The chassis alignment elements 36b, 36c, 36d can be arranged with respect to the respective chassis side 33b, 33c, 33d such as to match the position of the rack alignment elements 16b, 16c, 16d when the rack holding structure 40 is moved from the first position towards the second position, and the rack push element 45 pushes the consumable rack 10.

In fact, although the consumable rack 10 comprises four rack alignment elements 16a, 16b, 16c, 16d, only three rack alignment elements 16b, 16c, 16d may be needed for positioning. The symmetrical and squared shape of the consumable rack can allow, however, for the consumable rack 10 to be inserted into the rack receiving compartment 20 in any orientation. Therefore, all four rack alignment elements 16a, 16b, 16c, 16d can be equivalent and any three of them can be used. Analogously, any of the side edges 14a, 14b, 14c, 14d with their blunt faces 15a, 15b, 15c, 15d can be oriented towards the rack push element 45, thereby obtaining an equivalent relationship.

Figure 3:
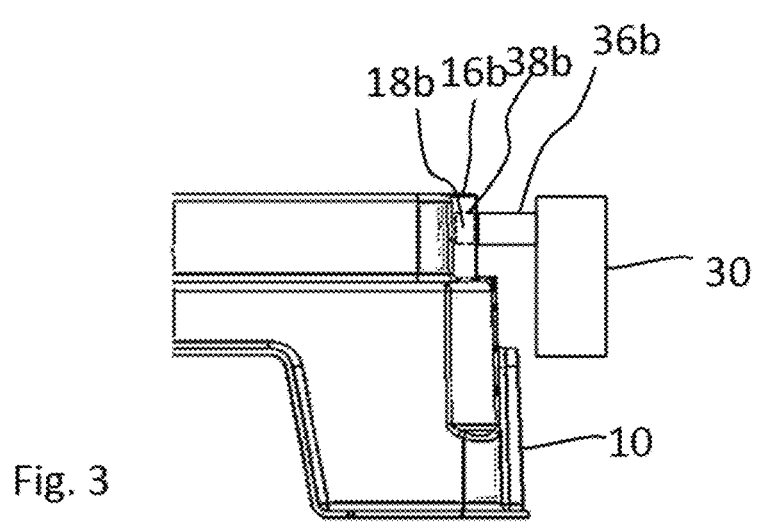
FIG. 3 illustrates a partial side view of the same embodiment of FIG. 2 according to an embodiment of the present disclosure.

According to an embodiment shown in FIG. 3, which is a partial side view of the same embodiment of FIG. 2, the contact faces 18a, 18b, 18c, 18d of the rack alignment elements 16a, 16b, 16c, 16d and the contact faces 38b, 38c, 38d of the chassis alignment elements 36b, 36c, 36d can have a different extension in the vertical direction respectively, such as to allow a positioning tolerance in the vertical direction. FIG. 3 shows only one rack alignment element 16b and respective contact face 18b of the consumable rack 10 and only one chassis alignment element 36b and respective contact face 38b of the chassis 30 for simplicity.

Figure 4:
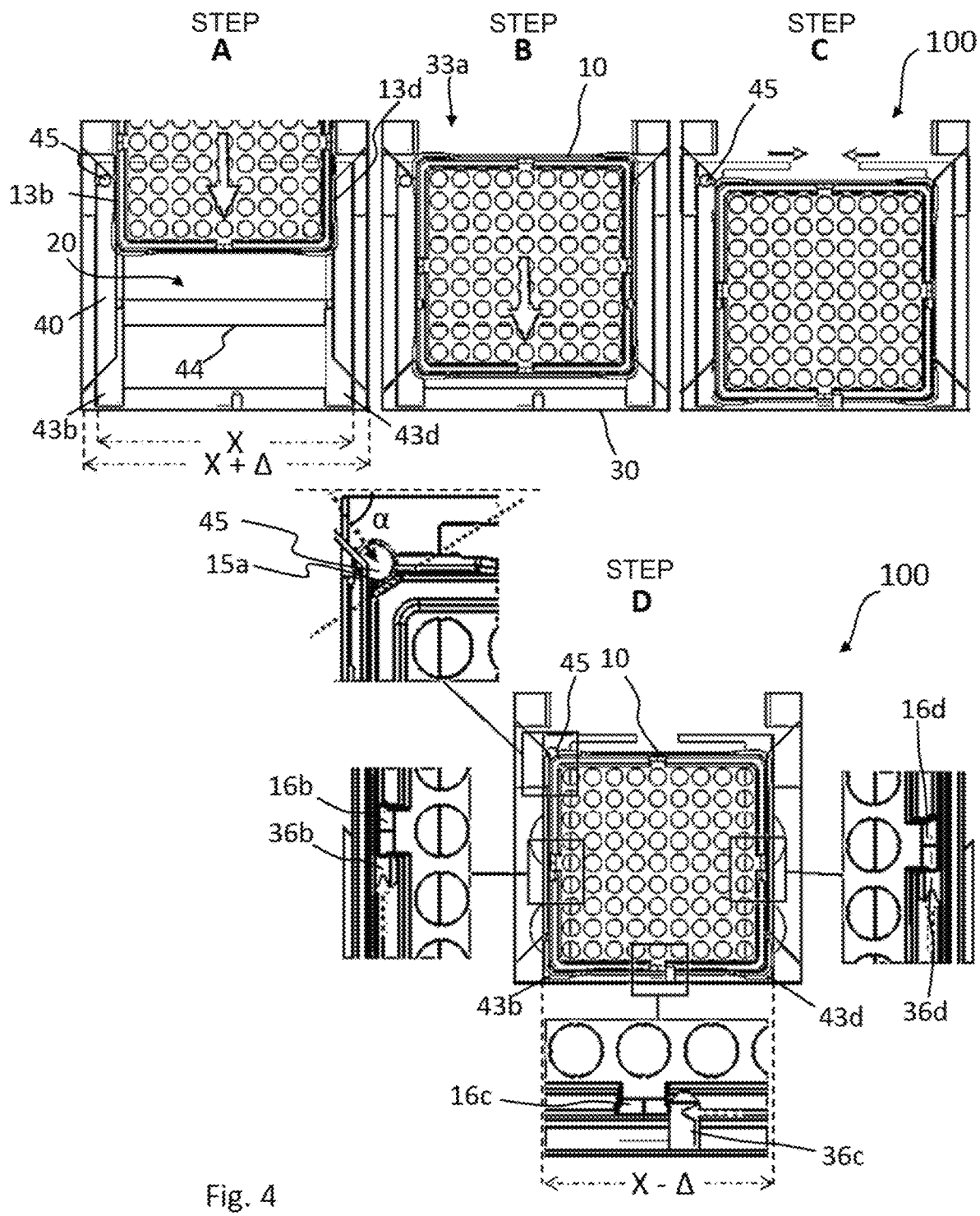
FIG. 4 illustrates an example of inserting and positioning a consumable rack into a rack receiving compartment of a rack positioning system according to an embodiment of the present disclosure.

FIG. 4 illustrates an example of the process for inserting and positioning a consumable rack 10 into a rack receiving compartment 20 of a rack positioning system 100. The rack holding structure 40 can further comprise a pair of base plates 43b, 43d movable relative to each other between different positions corresponding to different distances between the base plates 43b, 43d (see also FIG. 7). The base plates 43b, 43d can be movable from an intermediate position X corresponding to the first position of the rack holding structure 40 (step A, B and C in FIG. 4), to a closed position X-Δ (X minus Δ) corresponding to the second position of the rack holding structure 40 (step D in FIG. 4) where the base plates 43b, 43d can be closer to each other. In both the intermediate position X and the closed position X-Δ, a consumable rack 10 can rest with the bottom of two opposite rack sidewalls 13b, 13d on respective base plates 43b, 43d.

In steps A, B and C of FIG. 4, a consumable rack 10 can be first inserted in the rack receiving compartment 20 by sliding the consumable rack 10 with the bottom of the rack sidewalls 13b, 13d on the base plates 43b, 43d respectively through the front side 33a of the chassis 30, until it reaches the rear front side 33c of the chassis 30.

The rack push element 45 can be fixed to one of the base plates 43b such as to move together with the base plate 43b.

In step D of FIG. 4, the base plates 43b, 43d can be moved towards each other from the intermediate position X to the closed position X-Δ. By doing so, the rack push element 45 can push against the side edge face 15a of the consumable rack 10 forcing each of three rack alignment elements 16b, 16c, 16d against the respective chassis alignment element 36b, 36c, 36d and laterally holding the consumable rack 10 in a fixed position delimited by the three chassis alignment elements 36b, 36c, 36d.

The location and design of the rack push element 45, an example of which is illustrated in connection to FIGS. 5-7, as well as the orientation of the side edge face 15a, can be chosen so that the direction of the resulting push force applied against the side edge face 15a can have a particular angle α, the effect of which is explained in connection to FIG. 8 and FIG. 9.

Movement of the base plates 43b, 43d can be controlled by a motorized spindle drive 44. According to an embodiment, the base plates 43b, 43d can be moved to an open position X+Δ (X plus Δ) corresponding to a third position of the rack holding structure 40 wherein the base plates 43b, 43d can be farther from each other and a consumable rack 10 can be prevented from resting on the base plates 43b, 43d. In this position X+Δ, it can be possible to remove a consumable rack 10 from the rack receiving compartment 20 through a bottom side of the chassis 30 or to insert a consumable rack 10 through the bottom side of the chassis 30.

Figure 5:
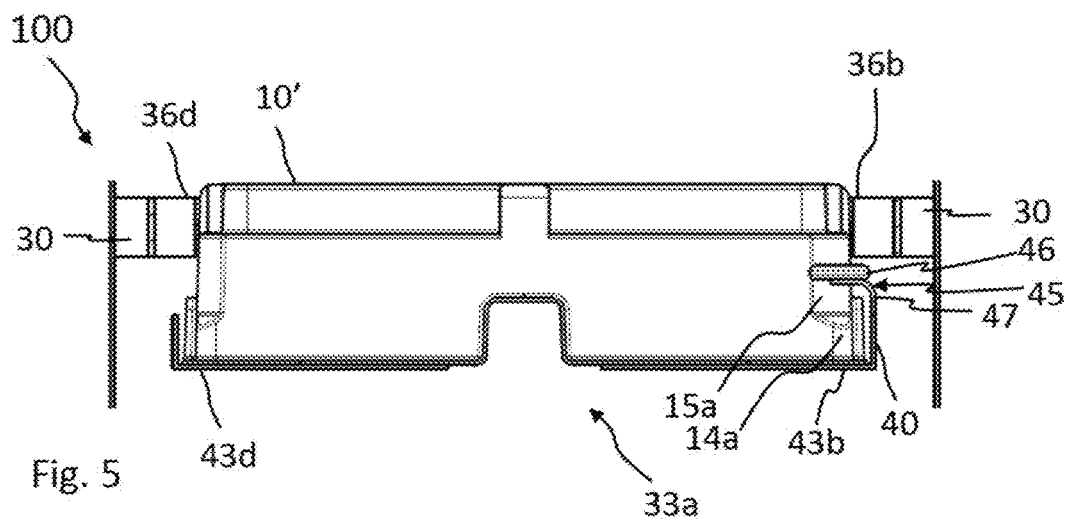
FIG. 5 illustrates a side view of a consumable rack positioned in a rack positioning system (parts removed for clarity) according to an embodiment of the present disclosure.
Figure 6:
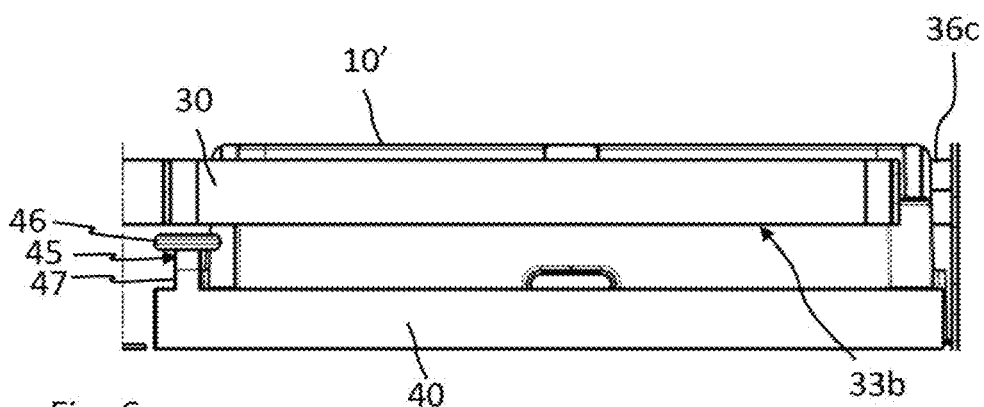
FIG. 6 illustrates a different side view of a consumable rack positioned in a rack positioning system (parts removed for clarity) according to an embodiment of the present disclosure.

FIG. 5 illustrates a consumable rack 10' positioned in a rack positioning system 100 (parts removed for clarity) seen from the front side 33a of the chassis 30. FIG. 6 illustrates the same consumable rack 10' of FIG. 5 in the same position as in FIG. 5 seen though the lateral side 33b of the chassis 30 (parts removed for clarity). In particular, elements of the chassis 30, comprising the rack alignment elements 36b, 36c, 36d and elements of the rack holding structure 40 comprising the base plates 43b, 43d and the rack push element 45 are shown. More in particular, it can be visible how the rack push element 45 can be fixed to one of the base plates 43b such as to be movable together with the base plate 43b and can comprise a ball bearing 46 for reducing friction by rolling against the blunt face 15a of side edge 14a of the consumable rack 10'. Also, the rack push element 45 can further comprise a resilient body 47 in order to prevent overloading or underloading the rack push element 45 and therefore allowing a certain tolerance in the amount and direction of the applied force when the rack holding structure 40 is moved from the first position to the second position (see FIG. 7). The consumable rack 10' can be identical to the consumable rack 10 of FIG. 1 to FIG. 4, with the exception that the rack sidewalls can have slight different design but identical function.

Figure 7:
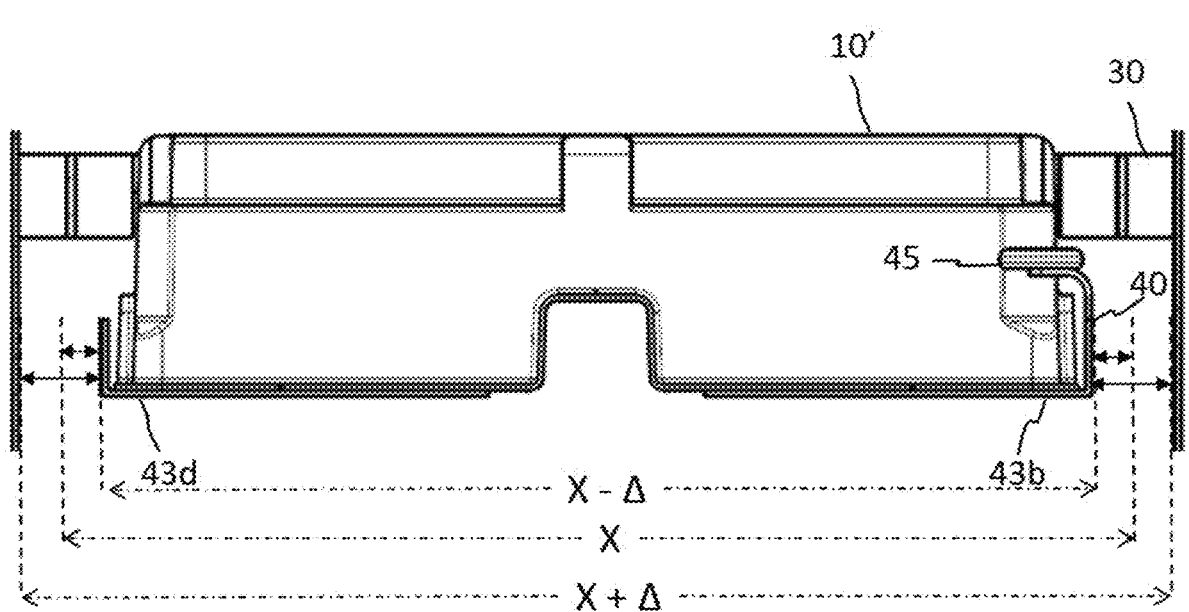
FIG. 7 illustrates different positions that can be assumed by a rack holding structure according to an embodiment of the present disclosure.

FIG. 7 illustrates different positions that can be assumed by the rack holding structure 40. As already described with reference to FIG. 4, the base plates 43b, 43d can be movable towards and away from each other thereby assuming different positions corresponding to different distances between the base plates 43b, 43d. In particular, the base plates 43b, 43d can be movable from an intermediate position X corresponding to the first position of the rack holding structure 40, to a closed position X−Δ (X minus Δ), corresponding to the second position of the rack holding structure 40, where the base plates 43b, 43d can be closer to each other and where Δ (delta) can be the difference in distance between the two positions. In both the intermediate position X and the closed position X−Δ, a consumable rack 10' can rest on the respective base plates 43b, 43d. In the intermediate position X, the rack 10' can be inserted or removed through the front side of the chassis 30. Upon movement of the rack holding structure into the closed position X−Δ, the rack 10' can be positioned by the force applied by the rack push element 45 that can move together with the base plate 43b.

The base plates 43b, 43d can be also moved from the closed position X−Δ back to the intermediate position X or to an open position X+Δ (X plus Δ) corresponding to a third position of the rack holding structure 40 wherein the base plates 43b, 43d can be farther from each other and a consumable rack 10' can be prevented from resting on the base plates 43b, 43d. In this position X+Δ, it can, for example, be possible to remove a consumable rack 10' through a bottom side of the chassis 30 or to insert a consumable rack 10' through the bottom side of the chassis 30.

Figure 8:
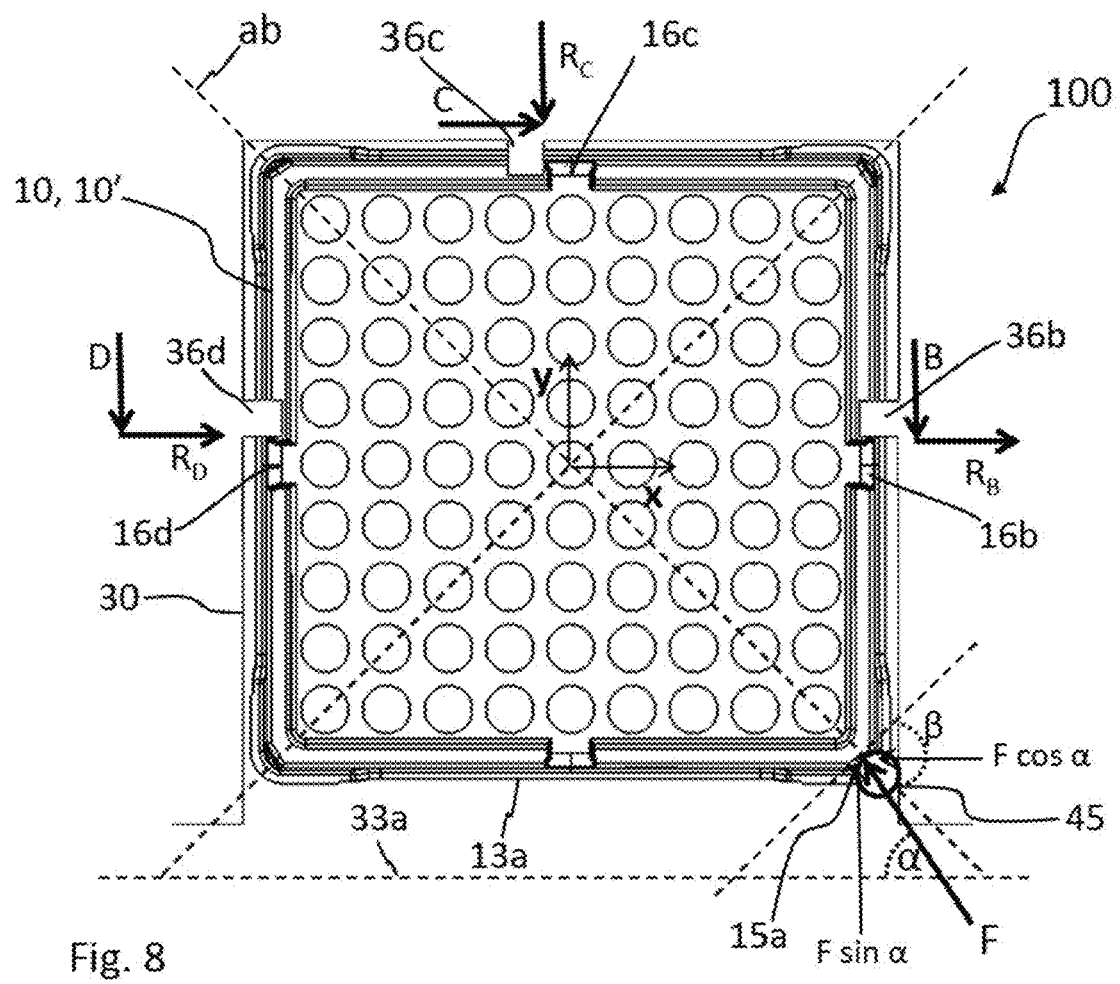
FIG. 8 illustrates the forces involved when positioning a consumable rack according to an embodiment of the present disclosure.
Figure 9:
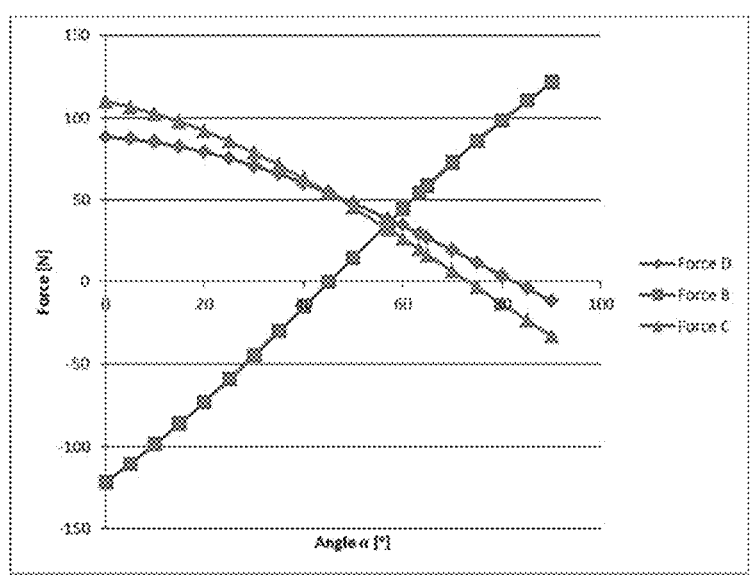
FIG. 9 illustrates a way of determining an optimal direction of the applied force for positioning a consumable rack according to an embodiment of the present disclosure.

FIG. 8 and FIG. 9 illustrate the forces involved when positioning a consumable rack 10, 10' in a rack positioning system 100 and how they change as a function of the direction of the force applied by the rack push element 45. In particular, the equilibrium of forces in the x direction can be described by the formula $R_D+C+R_B-F \cos \alpha=0$, where $R_D$ is the friction force at the interface between the rack alignment element 16d and the chassis alignment element 36d, C is the counter force exercised by the rack alignment element 36d, $R_B$ is the friction force at the interface between the rack alignment element 16b and the chassis alignment element 36b, F cos α is the vectorial component in the x direction of the force F applied by the rack push element 45 to the side edge face 15a at angle α with respect to the front rack sidewall 13a or a line parallel to the chassis front side 33a. The equilibrium of forces in the y direction can be described by the formula $-D-B-R_C+F \sin \alpha=0$, where D is counter force exercised by the rack alignment element 36d, B is counter force exercised by the rack alignment element 36b, $R_C$ is the friction force at the interface between the rack alignment element 16c and the chassis alignment element 36c, F sin α is the vectorial component in the y direction of the force F applied by the rack push element 45 to the side edge face 15a at the same angle α.

The friction forces can be determined by the formulas $R_D=D\mu$, $R_B=B\mu$ and $R_C=C\mu$ respectively, where μ is the coefficient of friction typical of the material used. For example, by using a plastic material for the rack 10, 10' and a metal for the chassis 30, the estimated coefficient of friction according to Roloff-Matek can be about 0.3 or in a range comprised between about 0.25 and about 0.4.

The graph of FIG. 9 plots how the distribution of forces D, C and B in Newton (N) varies by varying the angle α, while taking into account the friction forces $R_D$, $R_B$ and $R_C$ and a friction coefficient of 0.3. It can be seen that a substantial equilibrium of forces for D, B, and C can be obtained at an angle α of about 57°.

Without taking into account the friction forces $R_B$, $R_C$ and $R_D$, the angle α at which a substantial equilibrium of forces for B, C and D can be obtained is about 63-64° (not shown).

One way of fixing the angle α at a selected value, e.g., about 57° can be to design the rack 10, 10' and, in particular, the side edge face 15a at a corresponding orientation with respect to the rack push element 45. It can be noted in FIG. 8, that the side edge face 15a can be oriented at an angle β that can be different from 90° with respect to the rack diagonal ab. It can be noted also from FIGS. 5-7 that the side edge face 15a can be asymmetrical with respect to this diagonal line, i.e., more extended (inclined) towards the front sidewall 13a and less towards the lateral sidewall 13b.

Figure 10:
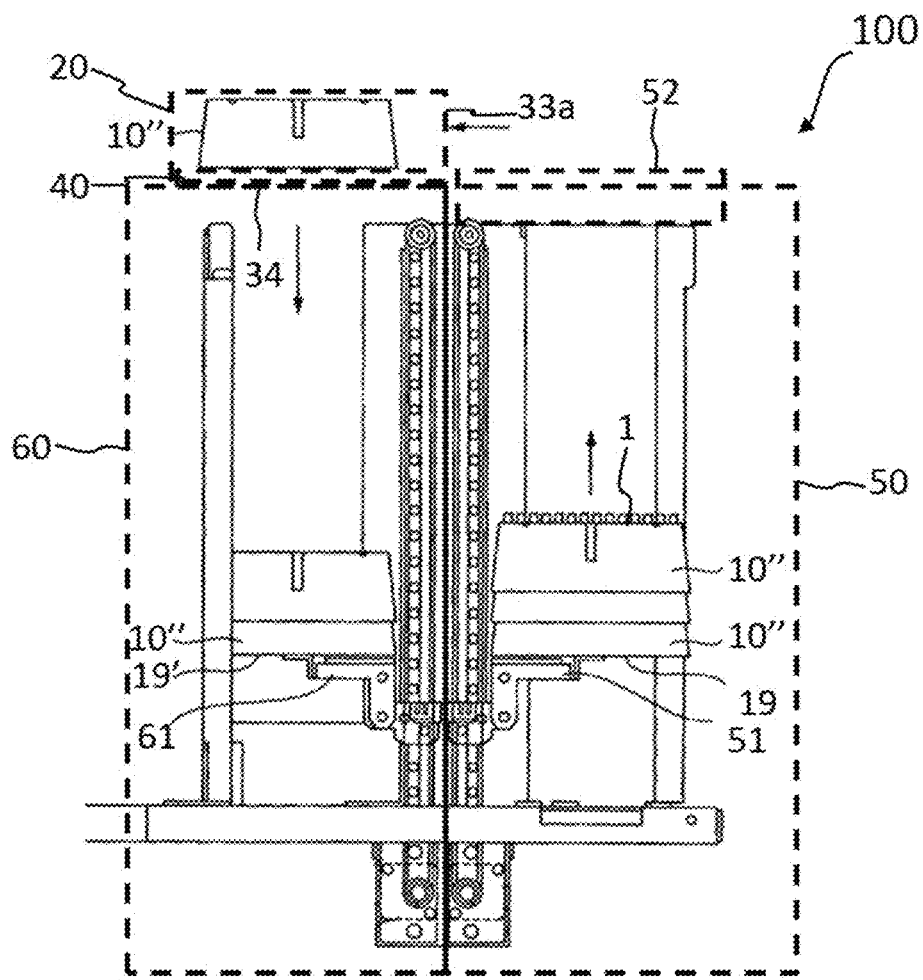
FIG. 10 illustrates other components of a rack positioning system according to an embodiment of the present disclosure.

FIG. 10 illustrates other components of a rack positioning system 100 according to an embodiment. In particular, the rack positioning system 100 can further comprise a front movable loading structure 50 configured for inserting a consumable rack 10" carrying consumables 1 into the rack receiving compartment 20 through the chassis front side 33a when the rack holding structure 40 is in the first position and a bottom movable unloading structure 60 for taking an empty rack 10" out of the rack receiving compartment 20 through a chassis bottom side 34 when the rack holding structure 40 is in the third position.

The front movable loading structure 50 and the bottom movable unloading structure 60 can both comprise a lift mechanism 51, 61 that can move stepwise upwards and downwards respectively in order to lift a stack 19, 19' of racks 10" and handing over to and taking over from the rack receiving compartment 20 one rack 10" at a time respectively.

The front movable loading structure 50 can further comprise a separating device 52, cooperating with the lift mechanism 51, for separating a rack 10" at a time from a stack 19 of racks and handing over the rack 10" to the rack receiving compartment 20 through the chassis front side 33a when the rack holding structure 40 is in the first position. A suitable separating device is, e.g., disclosed in U.S. Pat. No. 7,360,984 and not further elucidated here. The consumable rack 10" once used may be taken out of the rack receiving compartment 20 through a chassis bottom side 34 when the rack holding structure 40 is in the third position. For example, the lift mechanism 61, may be raised until nearly reaching the bottom of the rack 10" in the rack receiving compartment 20 and the rack 10" may be added on top of an eventual stack 19' of racks 10" already present in the unloading structure 60 until there is space for other racks 10". The lift mechanism 61 can move thus a step at a time lower corresponding top the height of a rack 10" until it reaches the lowest position, after which the entire stack 19' of used racks 10" can be taken out of the unloading structure 60 and the process can be repeated by building up a new stack 19'. Analogously, new consumables racks 10" can be inserted as a stack 19 of a predetermined number of consumable racks 10" fitting on the lift mechanism 51 when it can be in the lowest position and then the lift mechanism 51 can move one step at a time upwards corresponding to the height of a rack 10". Alternatively, any number of racks 10" can be added or removed at any time form a respective stack 19, 19'.

The consumable rack 10" can be similar to the consumable racks 10, 10' of FIG. 1 to FIG. 8, with the exception that the rack sidewalls can have different design but identical function.

Figure 11:
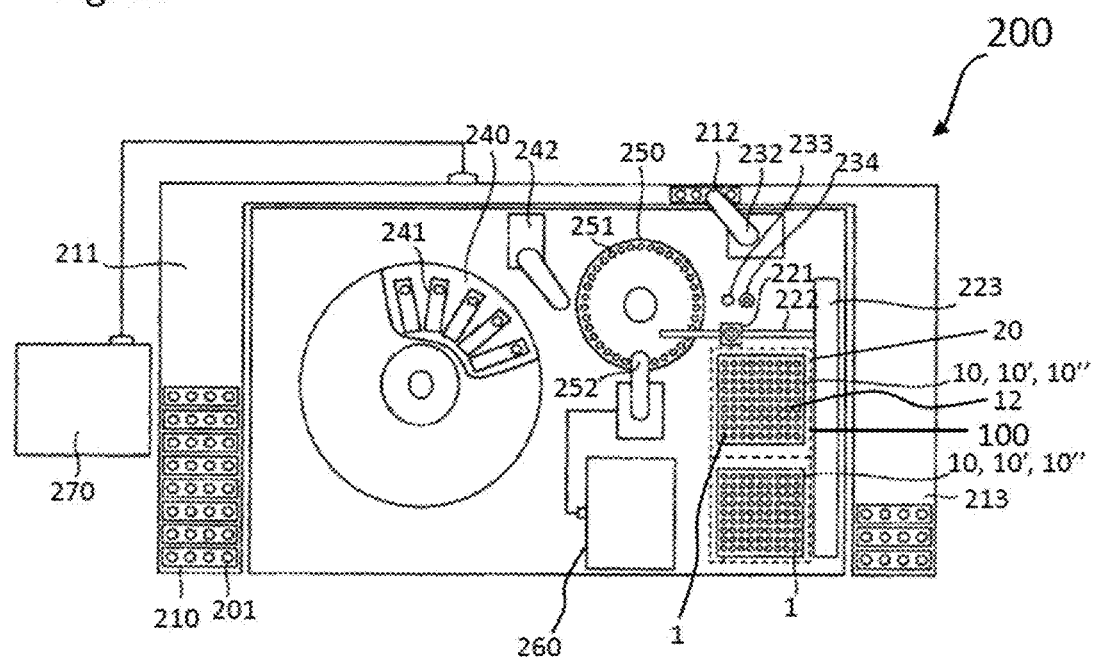
FIG. 11 illustrates an example of automated in vitro diagnostic system comprising a rack positioning system according to an embodiment of the present disclosure.

FIG. 11 illustrates an example of automated in vitro diagnostic system 200 comprising the rack positioning system 100. The automated in vitro diagnostic system 100 can further comprise a consumable manipulator 221 configured to cooperate with the rack positioning system 100 to manipulate a particular piece of consumable 1 in a rack 10, 10', 10" in a particular consumable holding position 12.

In this example, the consumables 1 can be reaction vessels used for receiving an aliquot of a sample and one or more reagents for a reaction to take place before detection. In particular, the in vitro diagnostic system 200 can comprise a sample loading unit 211 for loading sample racks 210 carrying sample tubes 201. The sample racks can be transported to an aspiration position 212 where a sample pipetting unit 232 can be located for aspirating an aliquot of sample from a sample tube 201, before moving further to an unloading unit 213. The in vitro diagnostic system 200 can further comprise a reagent compartment 240 comprising reagent containers 241 and a reagent pipetting unit 242 for aspirating reagents from the reagent containers 241. The in vitro diagnostic system 200 can further comprise an incubation station 250 comprising a plurality of reaction vessel holding positions 251, where reaction mixtures of samples and reagents added to reaction vessels 1 can be incubated before being aspirated by a third pipetting unit 252 and subjected to analysis by detector 260.

The consumable manipulator 221, is in this case, can be configured as a gripper for gripping and moving reaction vessels 1 within a predefined range of movement in a three-dimensional space, including a space above the rack receiving compartment 20, part of the space above the incubation station 250 and the space above a sample dispensing position 233 and reaction vessel disposing position 234. In particular, the consumable manipulator 221 can be configured to move in a plane along a first translation guide 222 and an orthogonal translation guide 223 and, in addition, in a vertical direction thereby enabling random access to any of the consumables 1 in the consumable rack 10, 10', 10".

The consumable manipulator 221 can be controlled by controller 270 to execute operations in connection to the use of the consumables 1 by the in vitro diagnostic system 200. In particular, in operation, the consumable manipulator can grip a reaction vessel 1 from one of the consumable holding positions 12 of a rack 10, 10, 10" positioned in the rack receiving compartment 20 of the rack positioning system 100 and place the reaction vessel 1 in the sample dispensing position 233. Here an aliquot of sample can be added by the sample pipetting unit 232. Then, the consumable manipulator 221 can grip again and move the reaction vessel 1 to one of the reaction vessel holding positions 251 of the incubation station 250. After detection, the consumable manipulator 221 can grip the used reaction vessel 1 from the incubation station 250 and transport it to the disposing position 234 where it can be disposed.

In the preceding specification, numerous specific details are set forth in order to provide a thorough understanding of the present disclosure. It will be apparent, however, to one having ordinary skill in the art that the specific detail need not be employed to practice the present teaching. In other instances, well-known materials or methods have not been described in detail in order to avoid obscuring the present disclosure.

Particularly, modifications and variations of the disclosed embodiments are certainly possible in light of the above description. It is therefore to be understood, that within the scope of the appended claims, the invention may be practiced otherwise than as specifically devised in the above examples.

Reference throughout the preceding specification to "one embodiment", "an embodiment", "one example" or "an example", "one aspect" or "an aspect" can mean that a particular feature, structure or characteristic described in connection with the embodiment or example can be included in at least one embodiment. Thus, appearances of the phrases "in one embodiment", "in an embodiment", "one example" or "an example", "one aspect" or "an aspect" in various places throughout this specification are not necessarily all referring to the same embodiment or example.

It is noted that terms like "preferably," "commonly," and "typically" are not utilized herein to limit the scope of the claimed embodiments or to imply that certain features are critical, essential, or even important to the structure or function of the claimed embodiments. Rather, these terms are merely intended to highlight alternative or additional features that may or may not be utilized in a particular embodiment of the present disclosure.

Furthermore, the particular features, structures, or characteristics may be combined in any suitable combinations and/or sub-combinations in one or more embodiments or examples.

We claim:

1. A rack positioning system for positioning a consumable rack in an automated in vitro diagnostic system, the rack positioning system comprising:
  a consumable rack comprising an upper surface, the upper surface comprising a plurality of consumable holding positions, wherein the consumable rack has a squared shape with the upper surface having a squared shape and a center, wherein the consumable rack comprises sidewalls on respective sides of the consumable rack, and wherein at least three rack sidewalls each comprise a rack alignment element aligned with the center; and
  a rack receiving compartment comprising a fixedly mounted chassis having a rectangular shape comprising a front side, a rear side, and two lateral sides and a rack holding structure movably coupled to the chassis such as to be movable between at least a first position (X) and a second position (X−Δ) relative to the chassis, wherein the chassis comprises three chassis alignment elements, each arranged at a fixed position of the rear side and each of the two lateral sides respectively and wherein the consumable rack holding structure comprises a rack push element arranged at and extending from a corner between the chassis front side and a chassis lateral side such as to engage with and push against a side edge of the rack between two rack sidewalls when the rack holding structure is moved from the first position (X) towards the second position (X−Δ), thereby forcing each of three rack alignment elements against a respective chassis alignment element and laterally holding the consumable rack in a fixed position delimited by the three chassis alignment elements.

2. The rack positioning system according to claim 1, wherein the rack alignment elements and the chassis alignment elements are abutment elements comprising contact faces matching each other.

3. The rack positioning system according to claim 2, wherein the contact faces of the rack alignment elements and the contact faces of the chassis alignment elements have a different extension in the vertical direction respectively, such as to allow a positioning tolerance in the vertical direction.

4. The rack positioning system according to claim 2, wherein the rack push element is arranged such as to apply a force to the side edge at an angle (a) different with respect to a 45 degrees angle of a diagonal line (ab) of the rack passing through the side edge, such as to obtain a substantial equilibrium of lateral forces.

5. The rack positioning system according to claim 4, wherein the angle (α) is an angle comprised between 50 and 70 degrees with respect to a horizontal line parallel to the rack sidewall facing the chassis front side.

6. The rack positioning system according to claim 5, wherein the angle is about 57 degrees, such as to take into account friction forces acting on the contact faces.

7. The rack positioning system according to claim 1, wherein the rack holding structure further comprises a pair of base plates movable relative to each other between different positions (X, X−Δ, X+Δ) corresponding to different distances between the base plates.

8. The rack positioning system according to claim 7, wherein the base plates are movable from an intermediate position (X) corresponding to the first position of the rack holding structure, which enables a consumable rack to rest with at least part of a bottom on the base plates, to a closed position (X−Δ) corresponding to the second position of the rack holding structure, wherein the base plates are closer to each other and the consumable rack is still enabled to rest with the bottom on the base plates, and to an open position (X+Δ) corresponding to a third position of the rack holding structure, and wherein the base plates are farther from each other and the consumable rack is prevented from resting on the base plates.

9. The rack positioning system according to claim 1, further comprising,
  at least one movable loading and/or unloading structure for loading and/or unloading the consumable rack into the rack receiving compartment.

10. The rack positioning system according to claim 9, wherein the at least one movable loading and/or unloading structure is configured to insert the consumable rack into or take the consumable rack out of the rack receiving compartment through the front side of the chassis when the rack holding structure is in the first position (X).

11. The rack positioning system according to claim 9, wherein the at least one movable loading and/or unloading structure is configured to insert the consumable rack into or take the consumable rack out of the rack receiving compartment through a bottom side of the chassis when the rack holding structure is in a third position (X−Δ).

12. The rack positioning system according to claim 9, further comprising,
  a front movable loading structure for inserting the consumable rack into the rack receiving compartment through the front side of the chassis and a bottom movable unloading structure for taking the consumable rack out of the rack receiving compartment through the bottom side of the chassis or a bottom movable loading structure for inserting the consumable rack into the rack receiving compartment through the bottom side of the chassis and a front movable unloading structure for taking the consumable rack out of the rack receiving compartment through the front side of the chassis.

13. The rack positioning system according to claim 9, wherein the at least one movable loading and/or unloading structure comprises a lift mechanism for raising and/or lowering a stack of consumable racks and handing over to and/or taking over from the rack receiving compartment one consumable rack at a time.

14. An automated in vitro diagnostic system, the automated in vitro diagnostic system comprising:
  the rack positioning system according to claim 1.

15. The automated in vitro diagnostic system according to claim 14, further comprising,
  a consumable manipulator configured to cooperate with the rack positioning system to manipulate a particular piece of consumable in the consumable rack in a particular consumable holding position.

* * * * *